Jan. 18, 1966   D. A. KOHL   3,230,462
PULSE AMPLITUDE DISTRIBUTION DISTORTION DETECTOR
Filed May 8, 1963
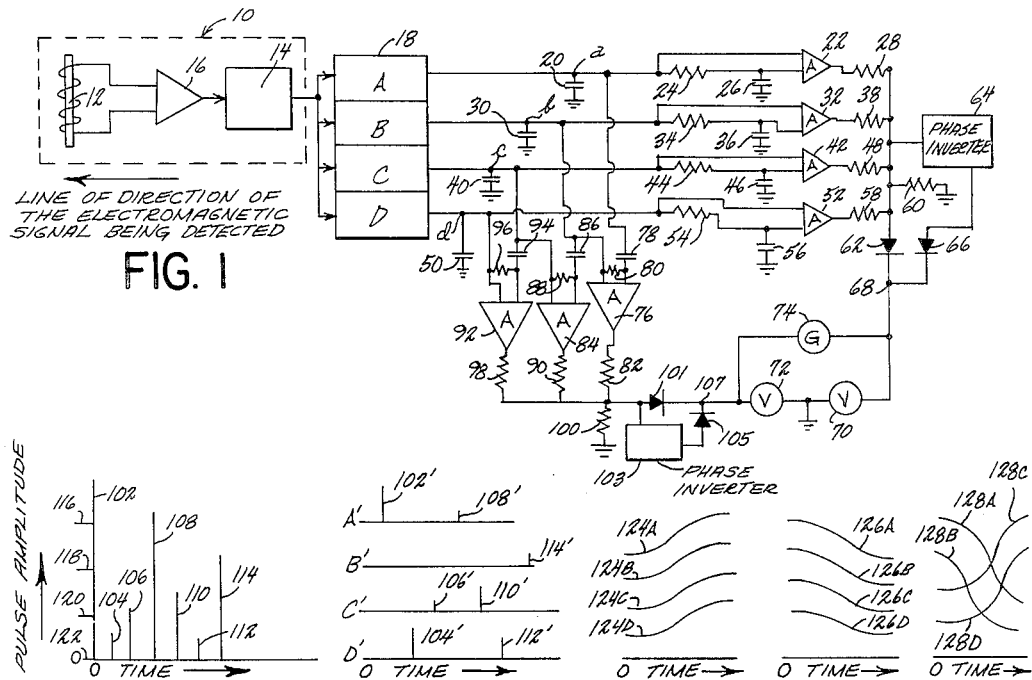
FIG. 1
FIG. 2
FIG. 3
FIG. 4
FIG. 5
FIG. 6
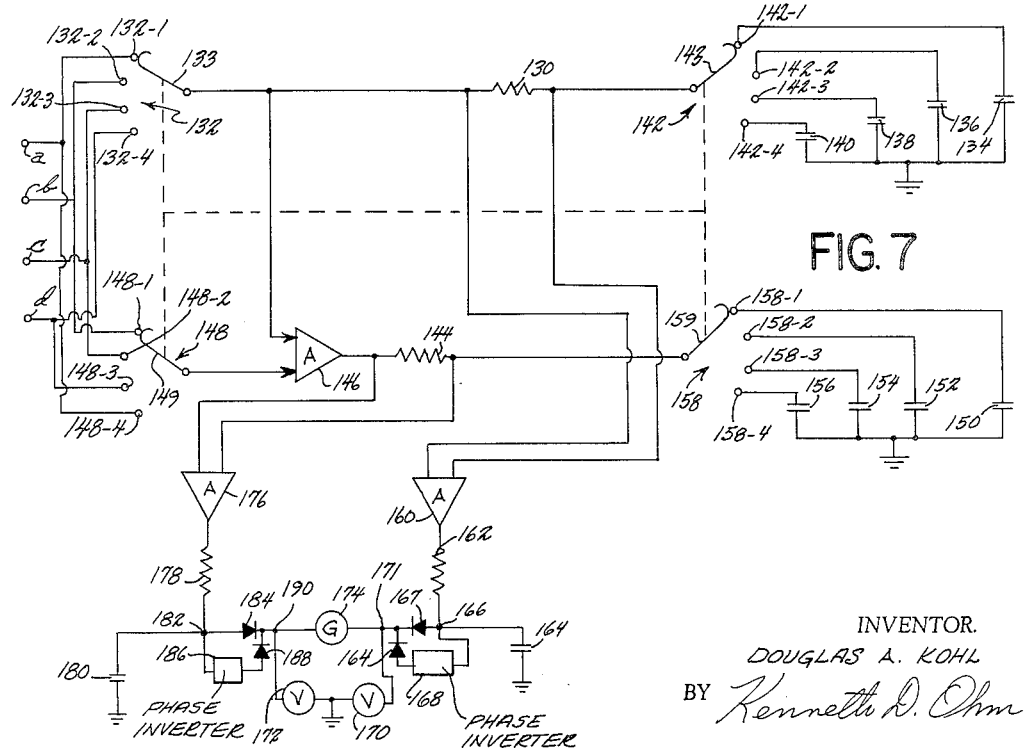
FIG. 7
INVENTOR.
DOUGLAS A. KOHL
BY Kenneth D. Ohm
ATTORNEY

# United States Patent Office 3,230,462
Patented Jan. 18, 1966

3,230,462
PULSE AMPLITUDE DISTRIBUTION DISTORTION DETECTOR
Douglas A. Kohl, Osseo, Minn., assignor, by mesne assignments, to Litton Systems, Inc., Beverly Hills, Calif., a corporation of Maryland
Filed May 8, 1963, Ser. No. 278,942
14 Claims. (Cl. 328—150)

The present invention relates to improvements in pulse amplitude detectors. More particularly, it pertains to a differential pulse amplitude detector.

It has been found that each different cumulo-nimbus type of weather condition provides electromagnetic signals which has a characteristic amplitude distribution pattern. That is, weather conditions such as thunderstorms, tornadoes, cyclones, etc. each provide an electromagnetic signal spectrum having a different amplitude distribution. Changes in these amplitude distribution patterns occur due to changing storm conditions. It has been empirically determined that a correlation exists between various severe weather phenomena, such as tornadoes and cyclones, and changes in the amplitude distributions of the electromagnetic signal spectrum emitted by such phenomena.

Accordingly, one object of this invention is to provide a detector for examining the changes, if any, in the amplitude distribution of an electromagnetic signal spectrum.

Another object of this invention is to provide a detector for examining the changes in the amplitude distribution of an electromagnetic signal spectrum and providing an electrical output when such spectrum undergoes a sudden change in shape.

Other objects and advantages of this invention will be apparent from the following description in which certain preferred embodiments of the invention are disclosed. In the drawings which form a part of this application, FIGURE 1 is an electrical circuit diagram, partially in block form, of a system constructed according to the present invention;

FIGS. 2, 3, 4, 5, and 6 are graphs illustrating, in part, the operation of the system of FIG. 1; and FIG. 7 is an electrical circuit diagram, partially in block form, of a system constructed according to the present invention.

Referring now more particularly to FIG. 1, numeral 10 depicts a direction finder 10 which includes a directional pickup coil 12 which provides an input to a detector 14 through an amplifier 16. The direction finder 10 is capable of providing positive electrical signals indicative of the electromagnetic signal being detected when the direction finder is detecting the line of direction of a particular electromagnetic signal. Direction finders for doing this are well known in the art. In addition, examples of specific systems that can be used for providing such positive electrical signals are disclosed in a copending application entitled Direction Finder, Serial No. 273,677 filed April 17, 1963, of which Douglas A. Kohl is the inventor.

The output of the direction finder 10 is fed to a differential pulse height analyzer 18. As is well known in the art the differential pulse height analyzer 18 includes a plurality of channeling circuits, such as depicted by blocks A, B, C, and D, each of which provides an output signal which is representative of the distribution, frequency of occurrence, of the various amplitudes of the input signal spectrum received by the differential pulse height analyzer.

The output of channel A of the differential pulse height analyzer 18 is connected to a grounded capacitor 20. The grounded capacitor 20 is connected directly to one input of a difference amplifier 22 and to the other input of the difference amplifier 22 through a resistor 24. The junction between the resistor 24 and said other input of the difference amplifier 22 is grounded through a capacitor 26. The output of the amplifier 22 is connected to a resistor 28. The arrangement of the resistor 24, the capacitor 26, and the amplifier 22 provides a time differential amplifier circuit.

The output of channel B of the differential pulse height analyzer 18 is connected to a grounded capacitor 30. The grounded capacitor 30 is connected directly to one input of a difference amplifier 32 and to the other input of said amplifier 32 through a resistor 34. The junction between the resistor 34 and said other input to the amplifier 32 is coupled to ground through a capacitor 36. The output of the amplifier 32 is connected to a resistor 38. The arrangement of the amplifier 32, the resistor 34, and the capacitor 36 provides a time differential amplifier circuit.

The output of channel C of the differential pulse height analyzer 18 is connected to a grounded capacitor 40. The capacitor 40 is connected directly to one input of a difference amplifier 42 and to the other input of the amplifier 42 through a resistor 44. The junction between the resistor 44 and said other input to the amplifier 42 is coupled to ground through a capacitor 46. The output of the amplifier 42 is connected to a resistor 48. The arrangement of the amplifier 42, the resistor 44, and the capacitor 46 provides a time differential amplifier circuit.

The output of channel D of the differential pulse height analyzer 18 is connected to ground through a capacitor 50. The capacitor 50 is directly connected to one input of a difference amplifier 52 and to the other input of the amplifier 52 through a resistor 54. The junction between the resistor 54 and said other input of the amplifier 52 is coupled to ground through a capacitor 56. The output of the amplifier 52 is connected to a resistor 58. The arrangement of the amplifier 52, the resistor 54, and the capacitor 56 provides a time differential amplifier circuit.

The resistors 28, 38, 48, and 58, are connected to ground through a resistor 60 and are also connected to a diode 62 which is shunted by a series connected phase inverter 64 and a diode 66. The common connection 68 of the diodes 62 and 66 is connected to a voltmeter 70 connected in series with a voltmeter 72. The voltmeters 70 and 72 have the connection therebetween grounded and are shunted by a galvanometer 74.

The capacitor 20 connected to the output of channel A is also connected to one input of a difference amplifier 76 through a capacitor 78. The other input of the difference amplifier 76 is connected to the capacitor 30. A resistor 80 is connected across the inputs of the amplifier 76 and a resistor 82 is connected to the output of the amplifier 76. The arrangement of the amplifier 76, the resistor 80, and the capacitor 78 provides a time differential amplifier circuit.

The capacitor 30 is also connected to a difference amplifier 84 through a capacitor 86. The other input of the amplifier 84 is connected to the capacitor 40. A resistor 88 is connected across the inputs of the amplifier 84 while the output of the amplifier 84 is connected to a resistor 90. The arrangement of the amplifier 84, the capacitor 86, and the resistor 88 provides a time differential amplifier circuit.

The capacitor 40 is also connected to one input of a difference amplifier 92 through a capacitor 94. The other input of the amplifier 92 is connected to the capacitor 50. A resistor 96 is connected across the inputs of the amplifier 92 while a resistor 98 is connected to the output of the amplifier 92. The arrangement of the amplifier 92, the capacitor 94, and the resistor 96 provides a time differential amplifier circuit.

The resistors 82, 90, and 98 are connected to ground through a resistor 100. The junction between the resistors 82, 90, 98, and 100 is connected to the voltmeter 72 and the galvanometer 74 through a diode 101. The diode 101 is shunted by a series connected phase inverter 103 and a diode 105. The common connection 107 of the diodes 101 and 105 is connected to the voltmeter 72 and the galvanometer 74.

When the direction finder 10 is detecting an electromagnetic signal specrum containing various pulses 102, 104, 106, 108, 110, 112, and 114 of different amplitudes as illustrated in FIG. 2, the differential pulse height analyzer 18 will function as follows. Channel A of the differential pulse height analyzer will count each pulse having an amplitude greater than amplitude 116, channel B will count each pulse having an amplitude greater than amplitude 118 and less than amplitude 116, channel C will count each pulse having an amplitude greater than amplitude 120 and less than amplitude 118, and channel D will count each pulse having an amplitude greater than amplitude 122 (zero) and less than amplitude 120. FIG. 3 illustrates the various portions 102′, 104′, 106′, 108′, 110′, 112′, and 114′ of the pulses 102, 104, 106, 108, 110, 112, and 114 respectively, which will be counted by the channels A, B, C, and D, respectively. The particular pulses which are thus counted provide the various outputs of the channels A, B, C, and D which are representative of the distribution, frequency of occurrence, of the various amplitudes present in an input signal fed simultaneously to said channels. The outputs of channels A, B, C, and D cause voltages across capacitors 20, 30, 40, and 50, respectively, which are indicative of the number of pulse amplitudes counted per unit time by the respective channels A, B, C, and D. The voltages across the capacitors 20, 30, 40, and 50 increase when their respective channel pulse counting rate increases and decrease when their respective channels count fewer pulses per second.

The voltage created across the capacitor 20 based on the output of channel A affects the output of the difference amplifier 22 as follows. If the voltage across capacitor 20 is increasing at a faster rate than the time constant of the resistor 24 and the capacitor 26, the output of the difference amplifier 22 will provide a positive output indicative of the amount of such increase. If, on the other hand, the voltage across the capacitor 20 is decreasing faster than the time constant of the resistance 24 and the capacitance 26, the output of the amplifier 22 will provide a negative output indicative of the amount of such decrease. If neither of these conditions occur, then the output of the amplifier 22 will be zero. The outputs of the difference amplifiers 32, 42, and 52 are affected by their associated circuits in the same manner as the output of the difference amplifier 22. That is, for a sufficiently rapid increase or decrease in the output of channel B, the output of the difference amplifier 32 will provide a positive or negative output, respectively, indicative of the amount of such change, for a sufficiently rapid increase or decrease in the output of channel C, the output of the difference amplifier 42 will provide a positive or a negative output, respectively, indicative of the amount of such change, and for a sufficiently rapid increase or decrease in the output of channel D, the output of difference amplifier 52 will provide a positive or negative output, respectively, indicative of the amount of such change.

The ohmic value of the resistor 60 is very very small compared to the ohmic value of the resistors 28, 38, 48, and 58. Accordingly, these resistors provide a current summing junction. Therefore, the outputs of the difference amplifiers 22, 32, 42, and 52 will be algebraically added. If this algebraic total is positive, a signal indicative of the magnitude thereof will be simultaneously applied through the diode 62 to one terminal of the voltmeter 70 and to one terminal of the galvanometer 74. If, on the other hand, this algebraic total is negative, a signal indicative of the magnitude thereof will be simultaneously applied through the phase inverter 64 and the diode 66 to one terminal of the voltmeter 70 and one terminal of the galvanometer 74. The current at junction 68 is thus the absolute value of the sum of each difference amplifier, 22, 32, 42, and 52.

If the count rate of channel A is increasing with respect to time as indicated by curve 124A of FIG. 4 and the rate of this increase is faster than the time constant of resistor 24 and capacitor 26, then the output of the difference amplifier 22 would be positive. If the count rate of the channel B were increasing as indicated by curve 124B of FIG. 4 and the rate of this increase is faster than the time constant of resistor 34 and capacitor 36, then the output of the difference amplifier 32 would be positive. If the count rate of channel C were increasing as indicated by curve 124C of FIG. 4 and the rate of this increase is faster than the time constant of resistor 44 and capacitor 46, then the output of the difference amplifier 42 would be positive. If the count rate of channel D were increasing as indicated by curve 124D of FIG. 4 and the rate of this increase is faster than the time constant of resistor 54 and capacitor 56, then the output of the difference amplifier 52 would be positive. The algebraic sum in such a situation would then be positive.

If the count rate of the channel A is decreasing at a faster rate than the time constant of the resistor 24 and the capacitor 26 as shown by curve 126A of FIG. 5, then the output of the difference amplifier 22 will be negative. If the count rate output of channel B is decreasing faster than the time constant of the resistor 34 and the capacitor 36 as illustrated by curve 126B of FIG. 5, then the output of the difference amplifier 32 will be negative. If the count rate output of channel C is decreasing faster than the time constant of the resistor 44 and the capacitor 46 as shown by curve 126C of FIG. 5, then the output of the difference amplifier 42 will be negative. If the count rate output of channel D is decreasing faster than the time constant of the resistor 54 and the capacitor 56 as illustrated by curve 126D of FIG. 5, then the output of the difference amplifier 52 will be negative. When each of the difference amplifiers 22, 32, 42, and 52, provide a negative output the algebraic sum thereof will be negative.

If the count rate output of channel A is decreasing faster than the time constant of the resistor 24 and the capacitor 26 as shown by curve 128A of FIG. 6, then the output of the difference amplifier 22 will be negative an amount indicative of this rate of change. If the count rate output of channel B is decreasing faster than the time constant of the resistor 34 and the capacitor 36 as illustrated by curve 128B of FIG. 6, then the output of the difference amplifier 32 will be negative an amount indicative of this rate of change. If the count rate output of channel C is increasing faster than the time constant of the resistor 44 and the capacitor 46 as illustrated by curve 128C of FIG. 6, then the output of the difference amplifier 42 will be positive an amount indicative of this rate of change. If the count rate output of channel D is increasing faster than the time constant of the resistor 54 and the capacitor 56 as illustrated by curve 128D of FIG. 6, then the output of the difference amplifier 52 will be positive an amount indicative of this rate of change. If the algebraic sum of the absolute amount of the negative outputs of the amplifiers 22 and 32 are equal to the algebraic sum of the absolute amounts of the negative outputs of the amplifiers 42 and 52, then the algebraic sum of all of their outputs will be zero. Whenever the algebraic sum of the outputs of the difference amplifiers 22, 32, 42, and 52 is zero and the electromagnetic signal spectrum being detected is that emitted by some type of weather condition, this is an indication that there is no change in the average pulse counting rate of storm activity.

Whenever the difference between the voltage across the capacitor 20 and the voltage across the capacitor 30 increases faster than the time constant of the resistor 80 and the capacitor 78, the amplifier 76 provides a positive output indicative of the amount of this increase. Whenever the difference between the voltage on the capacitor 20 and the voltage on the capacitor 30 decreases at a rate faster than the time constant of the resistor 80 and the capacitor 78, the amplifier 76 provides a negative output indicative of the amount of this decrease. The amplifiers 84 and 92 provide positive and negative outputs indicative of the amount of increase or decrease, respectively, applid to their inputs in substantially the same manner as such outputs are provided by the amplifier 76. That is, whenever the difference between the voltages on the capacitors 30 and 40 increase or decrease faster than the time constant of the resistor 88 and the capacitor 86, the amplifier 84 will provide positive or negative outputs, respectively, indicative of the amount of such increase or decrease, respectively. Whenever the difference between the voltages on the capacitors 40 and 50 increase or decrease faster than the time constant on the resistor 96 and the capacitor 94, the amplifier 92 will provide a positive or negative output, respectively, indicative of the amount of such increase or decrease, respectively.

The ohmic value of the resistor 100 is very very small compared to the ohmic value of the resistors 82, 90, and 98. Thus, these resistors provide a current summing junction. The output of this current summing junction is the algebraic sum of the absolute values of the outputs of difference amplifiers 76, 84, and 92. If this algebraic total is positive, a signal indicative of the magnitude thereof will be simultaneously applied through the diode 101 to one terminal of the voltmeter 72 and to one terminal of the galvanometer 74. If, on the other hand, this algebraic total is negative, a signal indicative of the magnitude thereof will be simultaneously applied through the phase inverter 103 and the diode 105 to one terminal of the voltmeter 72 and to one terminal of the galvanometer 74. The current at junction 107 is thus the absolute value of the sum of each difference amplifiers 76, 84, and 92.

Whenever this summing junction formed by resistors 82, 90, 98, and 100 provides a small output signal this is indicative of a small change in the amplitude spectrum shape of the electromagnetic signal being detected. Whenever this current summing junction provides a large output signal, this is indicative of a sudden change in the distribution of amplitudes of the electromagnetic signal spectrum being detected. Because of this, when the voltmeter 72 indicates either zero or a small positive voltage, this will be indicative of either no change in the pulse amplitude distribution of the electromagnetic signal spectrum being detected or slight changes in this "shape." When, on the other hand, the voltmeter 72 indicates a large positive signal, this is indicative of a sudden change in all amplitudes of the said electromagnetic signal spectrum.

The final output of the pulse amplitude distribution distortion detector shown in FIG. 1 is taken as a difference between the algebraic summation of the outputs of amplifiers 22, 32, 42, and 52 and the algebraic summation of the outputs of the amplifiers 76, 84, and 92. This difference is indicated by the galvanometer 74 which provides a signal the magnitude of which is representative of this difference. The change in total count rate represented by the signal impressed on junction 68, is canceled by the galvanometer 74 by applying this total count rate signal to one input of the galvanometer 74 and by applying the shape count rate represented by the signal impressed on the junction 107 to the second input of the galvanometer 74. It has been found, when the electromagnetic signal spectrum being detected is that emitted by some type of weather condition, that the greater the magnitude of the galvanometer signal the more severe is the storm, tornado, or cyclone.

Referring now more particularly to FIG. 7, points $a$, $b$, $c$, and $d$, correspond to the junctions of FIG. 1 which are similarly identified. The points $a$, $b$, and $c$ are successively connected to a resistor 130 and one input of a difference amplifier 146 through the agency of a stepping switch denoted generally by the reference numeral 132. This stepping switch includes a wiper arm 133 and four contacts, 132-1, 132-2, 132-3, and 132-4. The resistor 130 is also successively connected to the capacitors 134, 136, 138, and 140 through the agency of a stepping switch denoted generally by the reference numeral 142. This stepping switch includes a wiper arm 143 and four contacts 142-1, 142-2, 142-3, and 142-4. In addition, the points $b$, $c$, and $d$ are successively connected to a resistor 144 through a difference amplifier 146 through the agency of a stepping switch denoted generally by the reference numeral 148. This stepping switch 148 has a wiper arm 149 and contacts 148-1, 148-2, 148-3 and 148-4. The resistor 144 is successively connected to capacitor 150, capacitor 152, capacitor 154, and capacitor 156 through the agency of a stepping switch denoted generally by the reference numeral 158. This stepping switch includes a wiper arm 159 and contacts 158-1, 158-2, 158-3, and 158-4.

The wiper arms of the switches 132, 142, 148 and 158 are connected to rotate simultaneously and thus engage their similarly numbered contact points, e.g., 132-1, 142-1, 148-1, and 158-1 or 132-2, 142-2, 148-2, and 158-2 or 132-3, 142-3, 148-3, and 158-3 or 132-4, 142-4, 148-4, and 158-4, at the same time. The wiper arms may be rotated manually or by motor means (not shown) as long as this is done at a constant speed.

A difference amplifier 160 has its inputs connected across the resistor 130. The arrangement of the amplifier 160, the resistor 130, and the particular capacitor 134, 136, 138, or 140 which is connected to the resistor 130 through the switch 142 at any given instant provides a time differential amplifier circuit. The output of the amplifier 160 is connected to ground through a resistor 162 connected in series with a capacitor 164. The junction 166 between the resistor 162 and the capacitor 164 is connected through a diode 167 to voltmeter 170 which is connected in series with a voltmeter 172. The diode 167 is shunted by a phase inverter 168 and a diode 169 connected in series. The voltmeters 170 and 172 have the connection therebetween grounded and are shunted by a galvanometer 174.

A difference amplifier 176 has its inputs connected across the resistor 144. The arrangement of the amplifier 176, the resistor 144, and the particular capacitor 150, 152, 154, or 156 which is connected to the resistor 144 through the switch 158 at any given instant provides a time differential amplifier circuit. The output of the difference amplifier 176 is connected to ground through a resistor 178 connected in series with a capacitor 180. The junction 182 between the resistor 178 and the capacitor 180 is connected through a diode 184 to the voltmeter 172 and the galvanometer 174. The diode 184 is shunted by a phase inverter 186 and a diode 188 connected in series.

In operation when the wiper arm 133 engages contact 132-1, wiper arm 143 engages contact 142-1, wiper arm 149 engages contact 148-1 and wiper arm 159 engages conctact 158-1; when the wiper arm 133 engages contact 132-2, wiper arm 143 engages contact 142-2, wiper arm 149 engages contact 148-2 and wiper 159 engages contact 158-2; when the wiper arm 133 engages contact 132-3, wiper arm 143 engages contact 142-3, wiper arm 149 engages contact 148-3 and wiper 159 engages contact 158-3; and when wiper arm 133 engages contact 132-4, wiper arm 143 engages contact 142-4, wiper arm 149 engages contact 148-4 and wiper arm 159 engages contact 158-4. Accordingly, with the wiper arms as shown in FIG. 7, any increase in the voltage at point "$a$" which is faster than the time constant of the resistor 130 and the capacitor 134 will cause the amplifier 160 to provide a positive output representative of the magnitude of said increase. Similarly, any decrease in the voltage appearing at point "a" which occurs faster than the time constant of the resistor 130 and the capacitor 134 will cause the amplifier 160 to provide a negative output indicative of the magnitude of said decrease.

Since the time constant of the resistor 162 and the capacitor 164 is selected to be greater than the time required for the switches 132, 142, 148, and 158 to successively wipe across their respective number 1, number 2, number 3, and number 4 contacts and return to their respective number 1 contacts, the average of all of the outputs of the amplifier 160 will be stored across the capacitor 164. If this stored signal is positive, a signal indicative of the absolute magnitude thereof will be simultaneously applied through the diode 167 to one terminal of the voltmeter 170 and to one terminal of the galvanometer 174. If, on the other hand, this signal is negative, a signal indicative of the absolute magnitude thereof will be simultaneously applied through the phase inverter 168 and the diode 169 to one terminal of the voltmeter 170 and to one terminal of the galvanometer 174. The current at junction 171 is the absolute value of the average of all of the outputs of the difference amplifier 160.

With the wiper arms of the switches as shown in FIG. 7, any difference between the voltage appearing at point "a" and the voltage appearing at point $b$ will cause the amplifier 146 to provide an output signal. If the voltage at point $a$ is more positive than at point $b$, this output will be positive and indicative of the amount of such difference in voltage while, if said difference is such that $b$ is more positive than $a$, this output will be negative and indicative of the amount of this difference in voltage. If the rate of increase of the output of the amplifier 146 is faster than the time constant of the resistor 144 and the capacitor 150, this will cause the amplifier 176 to provide a positive output signal indicative of the amount of such increase. If the output of the amplifier 146 is decreasing at a rate faster than the time constant of the resistor 144 and the capacitor 150, this will cause the amplifier 176 to provide a negative output representative of the amount of such decrease. If the output of the amplifier 146 is increasing at a rate faster than the time constant of the resistor 144 and the capacitor 150, the voltage on the capacitor 180 will become more positive. If the output of the amplifier 146 is decreasing at a rate faster than the time constant of the resistor 144 and the capacitor 150, the voltage across the capacitor 180 will become less positive.

Since the time constant of the resistor 178 and the capacitor 180 is selected to be greater than the time required for the switches 132, 142, 148 and 158 to successively wipe across their respective number 1, number 2, number 3, and number 4 contacts and return to their respective number 1 contacts, the average of all of the outputs of the amplifier 176 will be stored across the capacitor 180. If this stored signal is positive, a signal indicative of the absolute magnitude thereof will be simultaneously applied through the diode 184 to one terminal of the voltmeter 172 and to one terminal of the galvanometer 174. If, on the other hand, this signal is negative, a signal indicative of the absolute magnitude thereof will be simultaneously applied through the phase inverter 186 and the diode 188 to one terminal of the voltmeter 172 and to one terminal of the galvanometer 174. The current at junction 190 is the absolute value of the average of all of the outputs of the difference amplifier 176.

When the switches of the system are on their number 2, number 3, and number 4 contact positions, amplifiers 146, 160 and 176 will provide similar outputs as they provided with the switches of the system in their number 1 contact position for the same reasons as explained that such amplifiers provided such outputs when the switches are in their number 1 contact positions.

The averaging circuit, resistor 162 and the capacitor 164, and the averaging circuit, resistor 178 and the capacitor 180 each constitutes a summing circuit for all positions of stepping switches 132, 142, 148, and 158. The time constant of resistor 162 and capacitor 164 and the time constant of the resistor 178 and the capacitor 180 are both larger than the period required for the wiper arms to sweep through all of their contact positions and return to their starting point. Thus, any change in voltage on the voltmeter 170 will be indicative of changes in the count rate output of channels A, B, C, and/or D which is indicative of changes in the average pulse counting rate of storm activity, while any changes in the voltage on the voltmeter 172 will indicate changes between the differences of the count rate outputs of channel A and channel B, of channel B and channel C, and/or of channel C and channel D which is indicative of the changes in the pulse amplitude distribution of the electromagnetic signal spectrum being detected. The magnitude of the signal voltage of the galvanometer 174 is representative of the difference between the voltages applied to the voltmeters 170 and 172. No change in this difference or a small change in this difference will indicate no or very slight change in the number and magnitude of amplitudes of the electromagnetic signal spectrum being detected while a large change in this difference will indicate a sudden change in the amplitude distribution of the electromagnetic signal spectrum being detected. It has been found that the greater the magnitude of this sudden change the more severe the storm, tornado or cyclone emitting the spectrum is likely to be.

In view of the principles set forth herein, I have shown some of the ways of carrying out the present invention and some of the equivalents which are suggested by these disclosures.

Now therefore I claim:

1. A pulse amplitude distribution distortion detector adapted for connection to a differential pulse height analyzer having a plurality of channels each of which provides an output that is representative of the number of pulses of predetermined amplitudes occurring during a predetermined time in the signal spectrum fed to said analyzer comprising a first time differential amplifying means for coupling to each of the plurality of channels of said analyzer for providing first signals for each such channel output indicative of the rate of change of each such output, a first summing network means for providing an algebraic total of all of said first signals, a second time differential amplifying means for coupling across predetermined pairs of said plurality of channel outputs of said analyzer for providing second signals indicative of the rate of change of the differences between said predetermined pairs of outputs, and a second summing network for providing an algebraic total of all said second signals.

2. A pulse amplitude distribution distortion detector like that set forth in claim 1 including means connected to the outputs of said summing networks for providing a signal indicative of the difference between the absolute magnitudes of said algebraic totals.

3. A pulse amplitude distribution distortion detector adapted for connection to a differential pulse height analyzer having a plurality of channels each of which provides an output that is representative of the number of pulses of predetermined amplitudes occurring during a predetermined time in the signal spectrum fed to said analyzer comprising a first time differential amplifying means for coupling to each of the plurality of channels of said analyzer for providing first signals for each such channel output indicative of the rate of change of each such output, a first summing circuit means for providing a second signal indicative of the algebraic total of all of said first signals, a second time differential amplifying means for coupling across predetermined pairs of said plurality of channel outputs of said analyzer for providing third signals indicative of the rate of change of the differences between said predetermined pairs of outputs, and a second summing circuit for providing a fourth signal indicative of the algebraic total of all said third signals.

4. A pulse amplitude distribution distortion detector like that set forth in claim 3 including means connected to said first summing circuit means for providing a fifth signal indicative of the absolute magnitude of said first summing circuit algebraic total, and means connected to said second summing circuit means for providing a sixth signal indicative of the absolute magnitude of said second summing circuit algebraic total.

5. A pulse amplitude distribution distortion detector like that set forth in claim 4 including means for providing a seventh signal indicative of the difference between said absolute magnitude signals.

6. A pulse amplitude distribution distortion detector adapted for connection to a differential pulse height analyzer having a plurality of channels each of which provides an output that is representative of the number of pulses of predetermined amplitudes occurring during a predetermined time in the electromagnetic signal spectrum fed to said analyzer comprising a first plurality of time differential amplifying means each for coupling to one of the plurality of channels of said analyzer for providing first individual signals for each such channel output indicative of the rate of change of each such output, a first summing network means connected to the outputs of all of said first plurality of time differential amplifying means for providing an algebraic total of all of said first individual signals, a second plurality of time differential amplifying means each for coupling across predetermined pairs of said plurality of channels of said analyzer for providing second individual signals indicative of the rate of change of the differences between each of said predetermined pairs of outputs, and a second summing network connected to the outputs of all of said second plurality of time differential amplifying means for providing an algebraic total of all said second individual signals.

7. A pulse amplitude distribution distortion detector like that set forth in claim 6 including means connected to the outputs of said summing networks for providing a signal indicative of the difference between the absolute magnitudes of said algebraic totals.

8. A pulse amplitude distribution distortion detector like that set forth in claim 6 including means connected to the output of said first summing means for providing a signal indicative of the absolute magnitude of said first summing means alegbraic total, and a means connected to the output of said second summing means for providing a signal indicative of the absolute magnitude of said second summing means algebraic total.

9. A pulse amplitude distribution distortion detector like that set forth in claim 8 including means connected to said absolute magnitude signal providing means for providing an indication of the magnitude of the difference between said absolute magnitudes.

10. A pulse amplitude distribution distortion detector comprising a differential pulse height analyzer having a plurality of channels each of which provides an output that is representative of the number of pulses of predetermined amplitudes occurring during a predetermined time in the signal spectrum fed to said analyzer, a first time differential amplifying means for coupling to each of the plurality of channels of said analyzer for providing first signals for each such channel output indicative of the rate of change of each such output, a first summing network means for providing an algebraic total of all of said first signals, a second time differential amplifying means for coupling across predetermined pairs of said plurality of channel outputs of said analyzer for providing second signals indicative of the rate of change of the differences between said predetermined pairs of outputs, and a second summing network for providing an algebraic total of all said second signals.

11. A pulse amplitude distribution distortion detector adapted for connection to a differential pulse height analyzer having a plurality of channels each of which provides an output that is representative of the number of pulses of predetermined amplitudes occurring during a predetermined time in the signal spectrum fed to said analyzer comprising a first switch means having a plurality of contacts corresponding to said plurality of said channel outputs, a second switch means having a plurality of contacts corresponding to said plurality of channel outputs, a first plurality of voltage storage means corresponding to said plurality of channel outputs, respective conductor means individually connecting each of said contacts of said second switch means with one of said first plurality of voltage storage means, a third switch means having a plurality of contacts corresponding to said plurality of channel outputs, a second plurality of voltage storage means corresponding to said plurality of channel outputs, respective conductor means individually connecting each of said contacts of said third switch means with one of said second plurality of voltage storage means, a first time differential amplifying means for individually coupling through individual contacts of said first switch means to each of the plurality of channels of said analyzer for providing first signals for each such channel output indicative of the rate of change of each such output, said first time differential amplifying means including a different one of said first plurality of storage means through said second switch means for each such channel output, a first summing network means for providing an algebraic total of all of said first signals occurring during a first predetermined period of time, a second time differential amplifying means for individually coupling across predetermined pairs of said plurality of channel outputs of said analyzer through pairs of contacts of said first switch means for providing second signals indicative of the rate of change of the differences between said predetermined pairs of outputs, said second time differential amplifying means including a different one of said second plurality of storage means through said third switch means for each such pair of channel outputs, and a second summing network for providing an algebraic total of all said second signals occurring during said first predetermined period of time.

12. A pulse amplitude distribution distortion detector like that set forth in claim 11 including means connected to the outputs of said summing networks for providing a signal indicative of the difference between the absolute magnitudes of said algebraic totals.

13. A pulse amplitude distribution distortion detector like that set forth in claim 11 including means connected to the output of said first summing means for providing a signal indicative of the absolute magnitude of said first summing means algebraic total, and means connected to the output of said second summing means for providing a signal indicative of the absolute magnitude of said second summing means algebraic total.

14. A pulse amplitude distribution distortion detector like that set forth in claim 13 including means connected to said absolute magnitude signal providing means for providing an indication of the magnitude of the difference between said absolute magnitudes.

No references cited.

ARTHUR GAUSS, *Primary Examiner.*